No. 831,984. PATENTED SEPT. 25, 1906.
C. A. PETERS.
SLIDING HOOK FOR HAULING CABLES.
APPLICATION FILED FEB. 24, 1906.
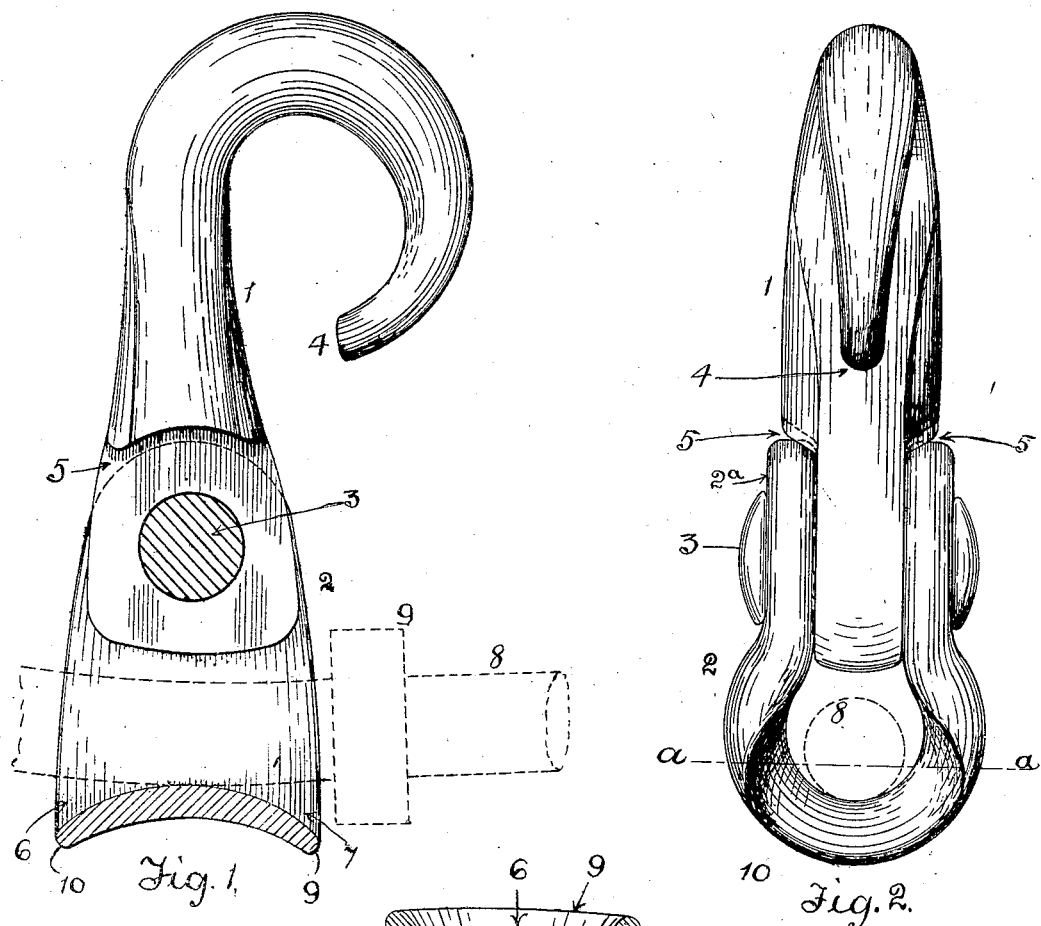
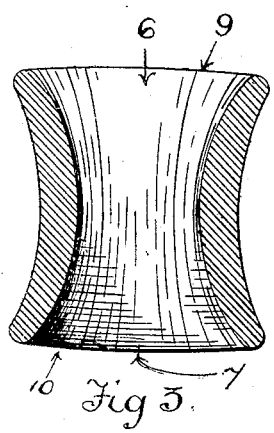
Witnesses:
Jas. H. Kouns.
Mrs. J. Wallace
Inventor;
Charles A. Peters
by F. J. Geisler
Atty.

UNITED STATES PATENT OFFICE.

CHARLES A. PETERS, OF GRESHAM, OREGON.

SLIDING HOOK FOR HAULING-CABLES.

No. 831,984.     Specification of Letters Patent.     Patented Sept. 25, 1906.

Application filed February 24, 1906. Serial No. 302,804.

*To all whom it may concern:*

Be it known that I, CHARLES A. PETERS, a citizen of the United States, and a resident of Gresham, in the county of Multnomah and State of Oregon, have invented a new and useful Improvement in Sliding Hooks for Hauling-Cables, of which the following is a specification, reference being had to the accompanying drawings as constituting a part thereof.

This invention relates to what is commonly called a "choker-hook," used in logging-camps for forming a noose to encircle a log for hauling the same by a cable, drawn by a donkey-engine or other convenient means; and it has for its object to obtain a hook which is so constructed as to slide freely on the cable under all circumstances and which is convenient to use, comparatively inexpensive to manufacture, and is, besides, durable in service.

I attain my object by the construction illustrated in the accompanying drawings, in which—

Figure 1 is a side elevation of my hook, the eye member of the same, however, being shown in section. Fig. 2 is an end elevation, and Fig. 3 is a plan section on line *a a* of Fig. 2.

The numerals designate the parts described.

My invention comprises a hook member 1 and an eye 2, pivotally attached to the root of the former by means of a rivet 3. As observable from Fig. 1, the bill of the hook is formed by tapering the body toward the extremity or point thereof and by so curving such tapered extremity as to space the point of the bill a distance from the body just sufficient to pass over the cable, while the main body of the bill is so curved and spaced as to provide a much wider opening than the diameter of the cable to be used. The root of the hook member 1 is provided with recesses 5 at both sides, in which to receive the upper ends 2ᵃ of the eye member 2. The eye 2 comprises a U-shaped body, and the lower portions of the body thereof are so formed as to be convexed on its inner surfaces on planes horizontally and longitudinally intersecting the same, the object being that the entrances 6 7 on both faces of the eye, leading into the hole thereof, shall be made very flaring, thereby allowing great freedom of movement to the hook on the cable and preventing any binding of the same thereon.

The cable is shown in Figs. 2 and 3 by outline 8, and 9 indicates the usual collar provided on the cable for limiting the sliding motion of the hook. The edges 10 of the eye are made rounding to prevent the same wearing away the surface of the cable while sliding thereon.

I claim—

1. An article of the class mentioned, comprising a hook member made with a tapering curved extremity, the end or point of which is spaced a distance from the body just sufficient to pass over a cable, and the main body of such curved extremity being spaced to provide a wider opening than the diameter of the cable, and an eye comprising a U-shaped body, the upper ends of which are pivoted to the root of the hook member and the lower portions of said eye-body being convexed on its inner surfaces on planes horizontally and longitudinally intersecting the same, so as to make both entrances to the hole of the eye flaring.

2. An article of the class mentioned, comprising a hook member made with a tapering curved extremity, the end or point of which is spaced a distance from the body just sufficient to pass over a cable, and the main body of such curved extremity being spaced to provide a wider opening than the diameter of the cable, the root of the hook member being made with recesses at its sides, and an eye comprising a U-shaped body, the upper ends of which are pivoted to the root of the hook member in said recesses, and the lower portions of said eye-body being convexed on its inner surfaces on planes horizontally and longitudinally intersecting the same, so as to make both entrances to the hole of the eye flaring.

3. An article of the class mentioned, comprising a hook member made with a tapering curved extremity, the end or point of which is spaced a distance from the body just sufficient to pass over a cable, and the main body of such curved extremity being spaced to provide a wider opening than the diameter of the cable, the root of the hook member being made with recesses at its sides, and an eye comprising a U-shaped body, the upper ends of which are pivoted to the root of the hook member in said recesses, and the lower portions of said eye-body being convexed on its inner surfaces on planes horizontally and longitudinally intersecting the same, so as to make both entrances to the hole of the eye flaring; and the edges of the eye being made rounding for the purpose specified.

In testimony whereof I have hereunto affixed my signature in the presence of two witnesses.

CHARLES A. PETERS.

Witnesses:
T. J. GEISLER,
L. F. PETERS.